United States Patent [19]

Rhyne et al.

[11] Patent Number: 4,636,927
[45] Date of Patent: Jan. 13, 1987

[54] DC TO AC CONVERTER

[75] Inventors: Earl C. Rhyne, Millis, Mass.; Lewis Illingworth, Exeter, N.H.

[73] Assignee: Fiskars Electronics Corporation, Cupertino, Calif.

[21] Appl. No.: 727,884

[22] Filed: Apr. 26, 1985

[51] Int. Cl.$^4$ .............................................. H02M 7/00
[52] U.S. Cl. ........................................ 363/15; 363/65; 363/71; 363/95
[58] Field of Search ..................................... 363/15–17, 363/34, 37, 65, 71, 97–98, 131–132, 135–136, 139, 95, 20–21

[56] References Cited

U.S. PATENT DOCUMENTS 4,348,719  9/1982  Hicks et al. .......................... 363/132
4,399,499  8/1983  Butcher et al. ................... 363/98 X

FOREIGN PATENT DOCUMENTS

0712913  1/1980  U.S.S.R. .............................. 363/132

Primary Examiner—Peter S. Wong

[57] ABSTRACT

A DC to AC converter has a linear output amplifier for simplification and for reducing distortion and output noise. A DC to DC converter or converters provides outputs regulated to have small predetermined voltage differentials to the supply output. This insures a high overall efficiency. A rectifier-filter added to the input converts the unit to an AC to AC power supply.

14 Claims, 9 Drawing Figures

FIG. 1
PRIOR ART
AC TO AC CONVERTER

FIG. 2
PRIOR ART
DC TO AC CONVERTER

FIG.3
DC TO AC CONVERTER WITH
WRAPAROUND CONTROL

FIG. 4
DC TO AC CONVERTER WITH
WRAPAROUND CIRCUIT

FIG. 5
DC TO AC CONVERTER WITH
DUAL DC TO DC CONVERTERS

FIG. 6
DC TO AC CONVERTER WITH STEERING GATES

DC TO AC CONVERTER

BACKGROUND OF THE INVENTION

The present invention relates to a DC to AC converter. More particularly, the invention relates to a converter for converting power from a DC source to AC power with controlled voltage and frequency. The converter of the invention may also convert AC power at one voltage and frequency to AC power at a different voltage and frequency.

For AC to AC conversion, the incoming AC power is first converted to DC by a rectifier and filter capacitor. The basic system operates from DC.

There are four principal parts to the known converter. A rectifier/capacitor is provided for operation from AC power. An oscillator or signal generator is utilized to generate the required output waveform. A DC to DC converter having tightly controlled positive and negative outputs is provided. The output voltages of the DC to DC converter vary in accordance with signals derived from the oscillator or signal generator. A linear amplifier is also utilized. The linear amplifier has positive and negative input voltages supplied by the DC to DC converter and controlled directly by the oscillator or signal generator.

In the DC to DC converter of the prior art, the DC input power is converted to positive and negative DC supplies with voltages greater than the peak values of the AC output. These supplies power a conventional linear or audio amplifier. While the system is simple it is not very efficient. The maximum possible efficiency occurs when the peak output voltage equals the relevant supply voltage, and is theoretically 78.5%, ignoring drive losses. In practice, the maximum achievable efficiency is less than 70%, and consequently the overall efficiency of the supply, including losses in the DC to DC converter, is typically between 50% and 60%.

The principal object of the invention is to provide a DC to AC converter having a high overall efficiency.

An object of the invention is to provide a DC to AC converter which produces a high quality output waveform.

Another object of the invention is to provide a DC to AC converter which supplies just enough voltage across the linear amplifier for satisfactory operation.

Still another object of the invention is to provide a DC to AC converter providing optimum efficiency by adjusting the positive and negative supply voltages to be as close as possible to the peak output without incurring amplifier distortion.

Yet another object of the invention is to provide a DC to AC converter wherein the positive and negative supply voltages are made to follow the AC output voltage as closely as possible, at all times, thereby optimizing the overall efficiency.

Another object of the invention is to provide a DC to AC converter having an amplifier efficiency of greater than 78.5%.

Still another object of the invention is to provide a DC to AC converter having an overall efficiency greater than 60%.

BRIEF SUMMARY OF THE INVENTION

In accordance with the invention, the DC to DC converter output voltage is controlled in a manner whereby "just enough" voltage is provided for the linear amplifier to operate satisfactorily. The outputs of the DC to DC converter are made to "wraparound" the output waveform and supply "just enough" voltage across the linear amplifier for satisfactory operation, thereby assuring high overall efficiency coupled with a high quality output waveform.

In accordance with the invention, optimum efficiency is achieved when the positive and negative supply voltages are adjusted to be as close as possible to the peak output without incurring amplifier distortion. In the converter of the invention, this is carried a stage further by making the positive and negative supply voltages follow the AC output voltage as closely as possible at all times. Thus, these voltages are no longer constant DC, but resemble the outputs from a full wave rectifier. The efficiency of the linear amplifier is no longer limited to a theoretical 78.5%, but depends on how closely the supply voltage is made to follow the output. Thus, efficiencies over 90% are possible.

In accordance with the invention, in a DC to AC converter for converting power from a DC source to an AC output and having DC to DC converter means having inputs connected to the DC source, positive, negative and common outputs and an additional input for converting DC input power to positive and negative DC supplies at its outputs with voltages greater than the peak values of the AC output, a low frequency signal generator having an output for generating an output waveform at its output, and a linear amplifier having positive, negative and common inputs connected to the corresponding outputs of the DC to DC converter means via positive, negative and common supply lines, respectively, an additional input connected to the output of the signal generator and an output whereby the AC output voltages vary with the output waveform of the signal generator and are provided at the output of the amplifier and a common point in the common supply line, control means connected to the outputs of the DC to DC converter means and between the output of the signal generator and the additional input of the DC to DC converter means controls the output voltages of the DC to DC converter means to provide just enough voltage for the linear amplifier to operate satisfactorily, thereby assuring high overall efficiency and a high quality output waveform.

The signal generator comprises a low frequency oscillator.

The signal generator comprises a waveform generator.

The control means includes means for controlling the positive and negative supply voltages to follow the AC output voltage as closely as possible at all times whereby the supply voltages resemble the outputs of a full wave rectifier.

The amplifier draws current from one of the positive and negative DC supplies and whichever supply is not loaded has a higher amplitude, and the control means includes means for responding only to the loaded DC to DC converter means output which for positive instantaneous output voltages is the positive output and the positive supply is controlled, and for negative instantaneous output voltages is the negative output and the negative supply is controlled.

The means for responding of the control means comprises a pair of comparators for positive and negative half cycles.

In a first embodiment of the invention, the control means comprises a first attenuator connected between the positive and common supply lines and having an output. A second attenuator is connected between the negative and common supply lines and has an output. The attenuators provide attenuated positive and negative outputs. Positive offset means has an input connected to the output of the signal generator and an output. Negative offset means has an input connected to the output of the signal generator and an output. The positive and negative offset means add offsets for the positive and negative half cycles, respectively, to the output waveform of the signal generator to establish the difference voltage between the input and output of the linear amplifier. A first comparator has an input connected to the output of the second attenuator, an input connected to the output of the positive offset means and an output. A second comparator has an input connected to the output of the first attenuator, an input connected to the output of the negative offset means and an output. The comparators compare the output waveform of the signal generator with the offsets and the attenuated positive and negative outputs of the attenuators. Coupling means couples the outputs of the comparators to the additional input of the DC to DC converter means thereby controlling the DC to DC converter means with the appropriate output of the comparators.

In a modification of the first embodiment of the invention, the control means comprises a first attenuator connected between the positive and common supply lines and having an output. A second attenuator is connected between the negative and common supply lines and has an output. The attenuators provide attenuated positive and negative outputs. Offset means has an input connected to the output of the signal generator and outputs for adding offsets for the positive and negative half cycles, respectively, to the output waveform of the signal generator to establish the difference voltage between the input and output of the linear amplifier. Comparator means has an input connected to the output of the first attenuator, an input connected to an output of the offset means, an input connected to the output of the second attenuator, an input connected to another output of the offset means and an output connected to the additional input of the DC to DC converter means.

The DC to DC converter means comprises a single DC to DC converter.

In a second embodiment of the invention, the DC to DC converter means comprises a positive output DC to DC converter having inputs connected to the DC source, positive and common outputs and an additional input for converting DC input power to a positive DC supply at its outputs with voltages greater than the positive peak values of the AC output. A negative output DC to DC converter has inputs connected to the DC source, negative and common outputs and an additional input for converting DC input power to a negative DC supply at its outputs with voltages greater than the negative peak values of the AC output.

In a third embodiment of the invention, the control means comprises steering gate means having an input connected to the positive supply line, an input connected to the negative supply line, an output connected to an input of the linear amplifier and an output connected to another input of the linear amplifier. The steering gate means switches the DC to DC converter means alternately positively and negatively. An attenuator is connected between the positive and negative supply lines between the DC to DC converter means and the steering gate means and has an output. The attenuator provides attenuated positive and negative outputs. Rectifier means has an input connected to the output of the signal generator and an output for rectifying the output waveform of the signal generator. Comparator means has an input connected to the output of the attenuator, an input connected to the output of the rectifier means and an output connected to the additional input of the DC to DC converter means.

In the first embodiment of the invention, the coupling means includes frequency compensating means and controls the amplitude of the output of the comparators.

In the first embodiment of the invention, the coupling means includes decision network means and phase compensating means for advancing the phase of the output waveform to obtain an increased voltage differential across the linear amplifier at the leading edge of the output waveform.

In the second embodiment of the invention, the control means comprises a first attenuator connected between the positive and common supply lines of the positive output converter and having an output. A second attenuator is connected between the negative and common supply lines of the negative output converter and has an output. The attenuators provide attenuated positive and negative outputs. A first comparator has an input connected to the output of the first attenuator, another input connected to the output of the signal generator and an output connected to the additional input of the positive output converter. A second comparator has an input connected to the output of the second attenuator, another input connected to the output of the signal generator and an output connected to the additional input of the negative output converter. The comparators compare the output waveform of the signal generator and the attenuated positive and negative outputs of the attenuators thereby controlling the positive output and negative output converters with the appropriate output of the comparators. Each of the positive output and negative output converters supplies the full power for one half the time.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
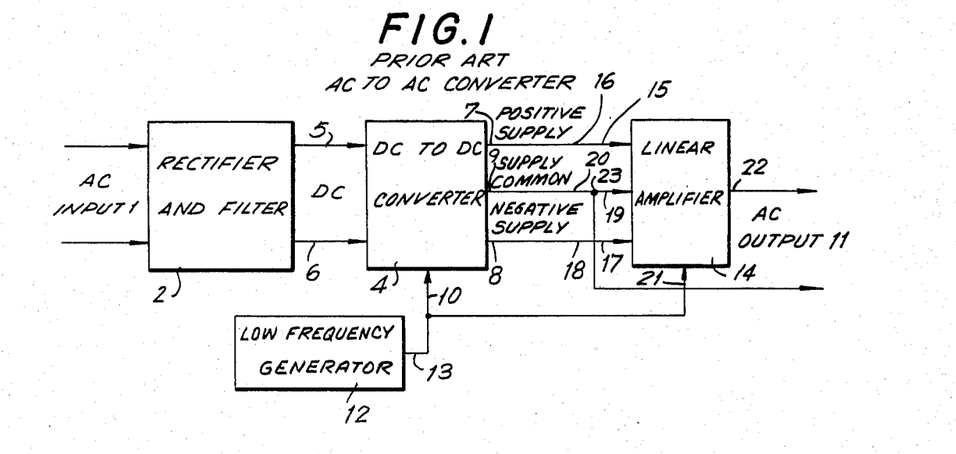
FIG. 1 is a block diagram of an embodiment of an AC to AC converter of the prior art.
Figure 2:
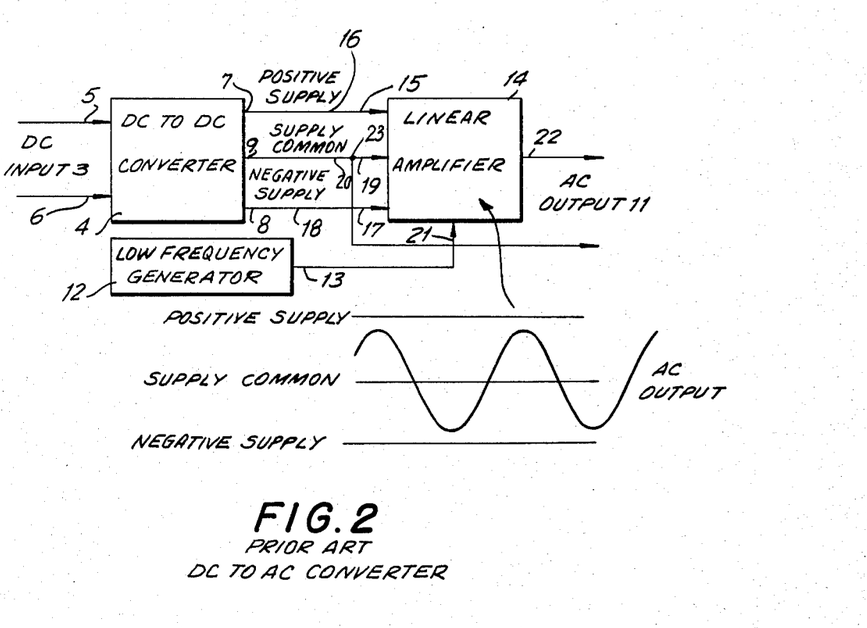
FIG. 2 is a block diagram of an embodiment of a DC to AC converter of the prior art.

The basic known DC to AC converter for converting power from a DC source to an AC is shown in FIG. 2 and the basic known AC to AC converter for converting power from AC power at one voltage and frequency to AC power at another voltage and frequency is shown in FIG. 1. In FIG. 1, AC from an AC source 1 is rectified and filtered by a rectifier and filter 2 of any suitable known type to produce a DC. In FIG. 2, as well as FIGS. 3 to 6, a DC source 3 provides the input DC.

A rectifier is a device to make a signal have only one voltage polarity, without otherwise distorting the signal. In the present application a precision full wave rectifier is used, rather than a common power rectifier. The circuit used is derived from a half wave rectifier circuit shown in "Linear Applications", National Semiconductor Corporation, Application Note AN-31, February, 1970.

In the converters of the prior art, as shown in FIG. 2, a DC to DC converter 4 has inputs 5 and 6 connected to the DC source 3, a positive output 7, a negative output 8, and a common output 9 and, in FIG. 1, an additional input 10. The DC to DC converter 4 may comprise any suitable known DC to DC converter and functions in a known manner to convert the DC input power to positive and negative DC supplies at its outputs 7 and 8, respectively, with voltages greater than the peak values of the AC output 11.

A DC to DC converter is a much used type of power supply that has been manufactured for many years by many companies. A DC to DC converter has an input DC voltage and from this derives an output voltage that is generally different to that of the input, and may or may not have the same polarity. These are described in the book, "Switching Power Converters" by Peter Wood, 1981, Litton Educational Publishing Inc. The specific types of DC to DC converters referred to here have output voltages that are regulated and made to be proportional to an input reference voltage, in this case derived from a low frequency generator. The output configuration in most cases has a positive and a negative voltage although in one variation (FIG. 6) has a single polarity. DC to DC converters that operate with high efficiency are known as switching converters, switching regulators, or switching power supplies. They may be forward, flyback, or resonant converters. The fact that they produce an output voltage that is proportional to an input voltage may classify the DC to DC converter as a programmable power supply. Some units have flyback converters, but larger units would use forward converters.

A low frequency signal generator 12 has an output 13 and generates an output waveform at said output. The signal generator 12 may comprise any suitable low frequency oscillator known in the art or any suitable waveform generator known in the art.

A suitable low frequency signal generator is a Wein Bridge Oscillator such as, for example, that described in the book, "Radio Engineering" by Terman, Third Edition, 1947, page 436, McGraw Hill Publishing Company. The particular circuit used is derived from a circuit in "Linear Applications", National Semiconductor Corporation, Application Note AN-31, February, 1970.

A linear amplifier 14 of any suitable known type is powered by the positive and negative supplies provided by the DC to DC converter 4. Thus, the linear or audio amplifier 14 has a positive input 15 connected to the positive output 7 of the DC to DC converter 4 via a positive supply line 16, a negative input 17 connected to the negative output 8 of said DC to DC converter via a negative supply line 18, and a common input 19 connected to the common output 9 of said DC to DC converter via a common supply line 20. The linear amplifier 14 also has an additional input 21 connected to the output 13 of the signal generator 12 and an output 22.

A linear amplifier is one which uses linear, as opposed to switching elements. Amplifiers suitable for the present application are class B amplifiers, as described in the book, "Solid State Radio Engineering" by Kraus, Bostian and Raab, published in 1980 by John Wiley & Sons Inc., page 355.

The AC output voltages of the prior art converters of FIGS. 1 and 2 vary with the output waveform of the signal generator 12 and are provided at the output 22 of the linear amplifier 14 and a common point 23 in the common supply line 20. The maximum possible efficiency occurs when the peak output voltage equals the relevant supply voltage. This efficiency is theoretically 78.5%, ignoring drive losses. Actually, the maximum achievable efficiency is less than 70%, and, consequently, the overall efficiency of the supply, including losses in the DC to DC converter is typically between 50 and 60%.

In accordance with the invention, as shown in FIGS. 3 to 6, the output voltage of the DC to DC converter is controlled to provide just enough voltage for the linear amplifier to operate satisfactorily. The DC to DC converter 4 outputs are made to "wraparound" the output waveform and supply "just enough" voltage across the linear amplifier 14 for satisfactory operation and in so doing assures high overall efficiency coupled with a high quality output waveform. Optimum efficiency is achieved when the positive and negative supply voltages are adjusted to be as close as possible to the peak output without incurring amplifier distortion. In the converter of the invention, this is carried a stage further by making the positive and negative supply voltages follow the AC output voltage as closely as possible, at all times. Thus, these voltages are no longer constant DC, but resemble the outputs from a full wave rectifier. The efficiency of the linear amplifier is no longer limited to a theoretical 78.5%, but depends on how closely the supply voltage is made to follow the output.

The wraparound control has to ensure that a minimum voltage difference is maintained between the DC to DC converter 4 outputs and the linear amplifier 14 output 11. In practice, the linear amplifier 14 will draw current from either the positive or the negative DC supplies, and whichever supply is not loaded will naturally have a higher amplitude. The control circuit, therefore, has to respond only to the loaded converter output which for positive instantaneous output voltages will be the positive output, and, conversely for negative instantaneous outputs, the negative supply will be the one to be controlled.

Figure 4:
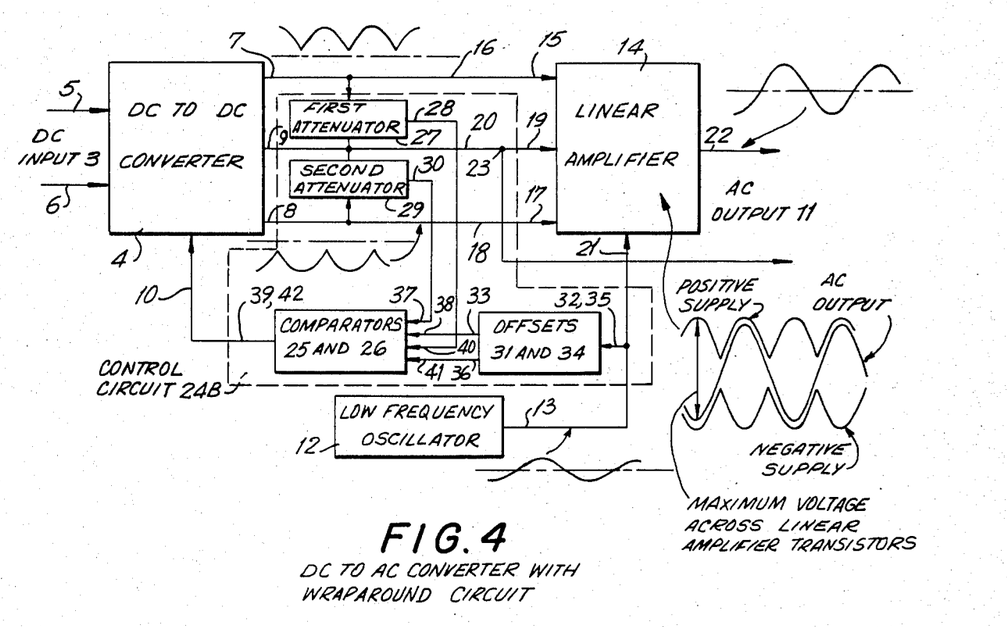
FIG. 4 is a block diagram of a modification of the first embodiment of the DC to AC converter of the invention, showing the voltages at some of the components of said converter.
Figure 5:
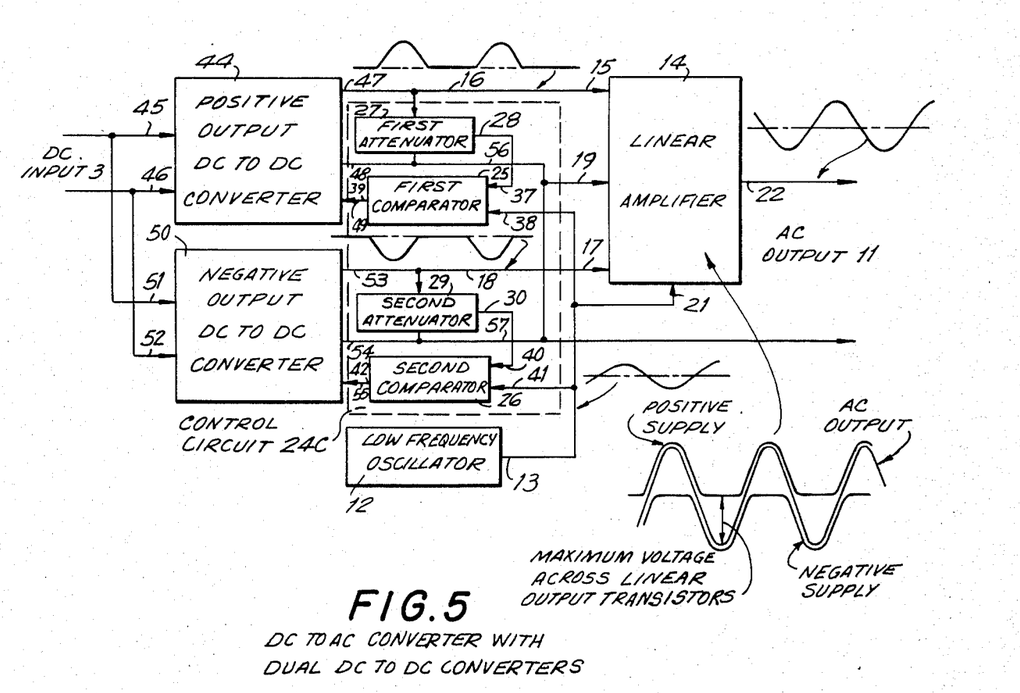
FIG. 5 is a block diagram of a second embodiment of the DC to AC converter of the invention, having dual DC to DC converters.

In accordance with the invention, the converter of the prior art is improved by connecting a control circuit 24A, 24B, 24C or 24D (FIGS. 3 to 6) to the outputs 7, 8 and 9 of the DC to DC converter 4 and between the output 13 of the signal generator 12 and the additional input 10 of said DC to DC converter. The control circuit 24A, 24B, 24C or 24D controls the output voltages of the DC to DC converter 4 to provide just enough voltage for the linear amplifier 14 to operate satisfactorily, thereby assuring high overall efficiency and a high quality output waveform. The control circuit 24A, 24B, 24C or 24D includes components for controlling the positive and negative supply voltages to follow the AC output voltage as closely as possible at all times whereby said supply voltages resemble the outputs of a full wave rectifier (FIGS. 4 and 5).

The linear amplifier 14 draws current from the positive or negative DC supply. Whichever supply is not loaded has a higher amplitude. The control circuit 24A, 24B, 24C or 24D includes components for responding only to the loaded DC to DC converter 4 output. This is the positive output for positive instantaneous output voltages, and the positive supply is controlled, and it is the negative output for negative instantaneous output voltages, and the negative supply is controlled.

Figure 3:
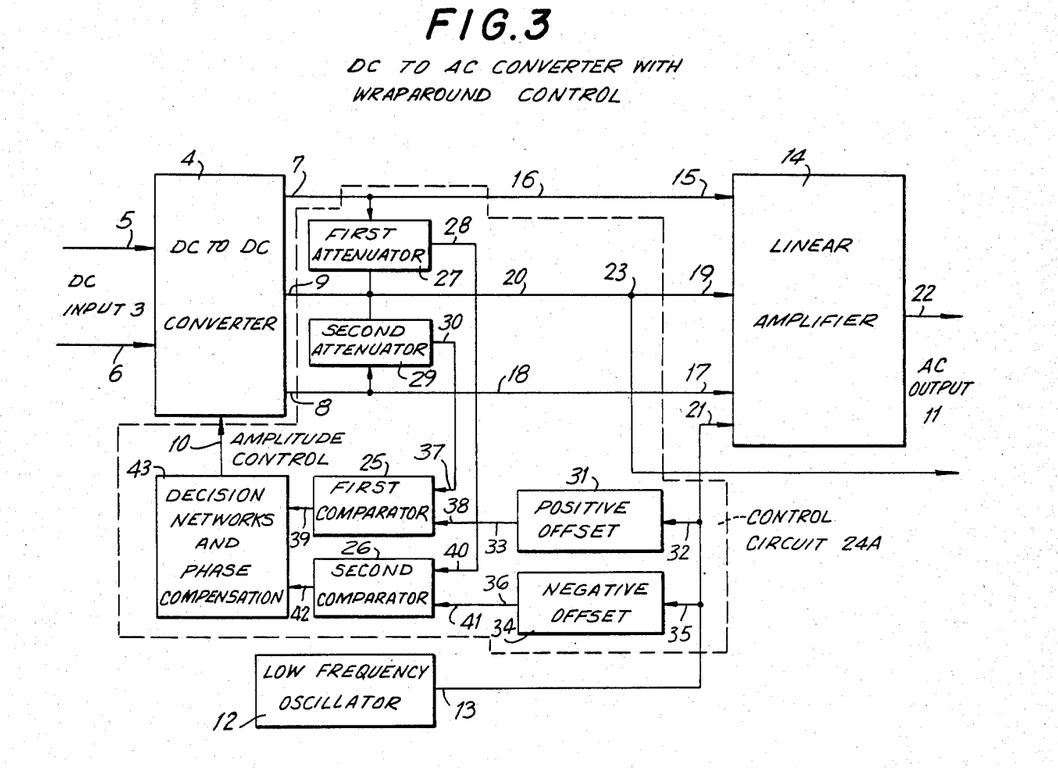
FIG. 3 is a block diagram of a first embodiment of the DC to AC converter of the invention, having wrap-around control.

The first embodiment of the invention, shown in FIG. 3, discloses one embodiment of wraparound control in which the components for responding only to the loaded DC to DC converter 4 output are a pair of comparators 25 and 26 for positive and negative half cycles, respectively. In FIG. 3, the output of the low frequency oscillator 12 is proportional to the output voltage. An offset is added to this to establish the difference voltage between the input of the linear amplifier 14 and its output 11. Since there are two supplies, separate offsets are added for the positive and negative half cycles. The low frequency references with associated offsets are compared with attenuated positive and negative outputs and the appropriate comparator output is used to control the DC to DC converter 4.

Thus, in the embodiment of FIG. 3, the control circuit 24A comprises a first attenuator 27 connected between the positive and common supply lines 16 and 20, respectively, and having an output 28. A second attenuator 29 is connected between the negative and common supply lines 18 and 20, respectively, and has an output 30. The attenuators 27 and 29 are of any suitable known type and provide attenuated positive and negative outputs, respectively.

An attenuator is a passive resistive device for providing a small signal that is proportional to a larger input. Attenuators are used in the present application to reduce high voltage levels to low ones suitable for the electronic control circuitry. Attenuators are extensively described in the book, "Reference Data for Engineers" by the International Telephone and Telegraph Corporation, Fifth Edition, published by Howard W. Sams & Co. Inc., 1968, Chapter 10.

A positive offset component 31 has an input 32 connected to the output 13 of the signal generator 12 and an output 33 (FIG. 3). A negative offset component 34 has an input 35 connected to the output 13 of the signal generator 12 and an output 36 (FIG. 3). The positive and negative offset components 31 and 34 may comprise any suitable offset circuits known in the art and add offsets for the positive and negative half cycles, respectively, to the output waveform of the signal generator 12 to establish the difference voltage between the input and output of the linear amplifier 14.

Figure 8:
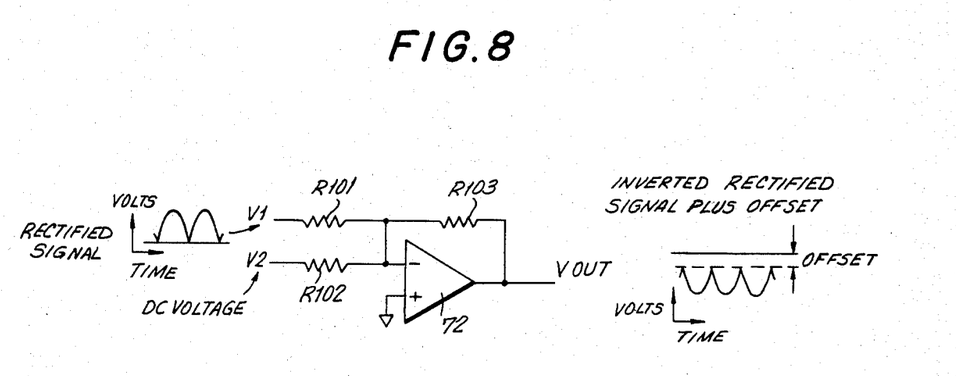
FIG. 8 is a circuit diagram of an offset circuit.

An offset is added to the rectified sinewave signal. The circuit of FIG. 8 will accomplish this. The amplifier 72 is an operational amplifier. The output voltage $$VOUT = -\left[\frac{V1R103}{R101} + \frac{V2R103}{R102}\right]$$

where $\frac{V2R103}{R102}$ constitutes the offset.

The first comparator 25 has an input 37 connected to the output 30 of the second attenuator 29, an input 38 connected to the output 33 of the positive offset component 31 and an output 39, as shown in FIG. 3. The second comparator 26 has an input 40 connected to the output 28 of the first attenuator 27, an input 41 connected to the output 36 of the negative offset component 34 and an output 42, as shown in FIG. 3. The comparators 25 and 26 may comprise any suitable known comparators and compare the output waveform of the signal generator 12 with the positive and negative offsets and the attenuated positive and negative outputs of the attenuators 27 and 29, respectively.

The comparators used in the present application are differential amplifiers. The term comparator refers to a special type of differential amplifier that is not actually used in this system and its use could be misleading. Actually, the signals are compared by a differential amplifier, and the output from the differential amplifier is the difference between the signals, amplified by a set amount. Differential amplifiers are described in "Electronic Designers Handbook" by Landee, Davis, Albrecht, McGraw Hill Book Co. Inc., 1957, Chapters 3-17.

The outputs 39 and 42 of the comparators 25 and 26, respectively, are coupled to the additional input 10 of the DC to DC converter 4 via a coupling 43 which includes frequency compensating means, which is necessary in any closed loop system, and controls the amplitude of the output of said comparators. The coupling 43, as shown in FIG. 3, includes decision networks of any suitable known type and a phase compensating circuit of any suitable type. The phase compensating circuit advances the phase of the output waveform to obtain an increased voltage differential across the linear amplifier 14 at the leading edge of the output waveform. The DC to DC converter 4 is thereby controlled with the appropriate output of the comparators 25 and 26.

The decision network consists of gates for selecting the control circuit to operate at different parts of the cycle. Thus, for example, in FIG. 3, the first comparator 25 is selected when the output is positive and the second comparator 26 is selected when the output is negative. The gating function may be accomplished in many ways, for example, with an analog bilateral switch, such as, for example, RCA type CD 4016B, listed in RCA Data Book, "C MOS Integrated Circuit", 1983, RCA Corporation.

The phase compensation network is a network which corrects the phase of feedback signals to prevent unwanted oscillations. A suitable phase compensation network is comprehensively described in "Vacuum Tube Amplifiers" by Valley and Wallman, McGraw Hill Book Co. Inc., 1948, Chapter 9, entitled "Low Frequency Amplifiers With Stabilized Gain", pages 333 to 383.

When the supply is used to drive a reactive load for some time periods during each cycle, power will be fed back through the linear amplifier 14. When this happens, the DC to DC converter 4 loses its load and will be shut down for the time that reverse current is flowing. Should this happen when the output is positive, the current flow will be from the output to the negative supply. With the converter shut down, the negative supply will collapse to zero volts. Thus, the reverse current does not flow from a positive output all the way to negative, but is dumped to the output common. This minimizes dissipation in the linear amplifier 14 during reverse current flow.

The wraparound DC outputs need not follow the output voltage with a constant offset, as hereinbefore described. It is often preferable to increase the offset as the output voltage falls, in order to accommodate transients at output zero crossings due to imperfect DC to DC converter response to sharp discontinuities in the wraparound shape. The phase of the wraparound waveform is advanced in order to obtain an increased voltage differential across the linear amplifier 14 at the leading edge of the output waveform, as hereinbefore mentioned.

The converter of the invention is readily adaptable to non-sinusoidal signals, providing that the frequency range is within the handling capabilities of the DC to DC converter 4. DC offsets may also be added. This is accomplished by replacing the low frequency oscillator 12 of FIG. 3 with a waveform generator, or adding a DC offset between said oscillator and the control circuit 24A.

In the modification of FIG. 4, the coupling 43 is eliminated from the control circuit 24B. Thus, the modification of FIG. 4 is a simplified version of the embodiment of FIG. 3. In the modification of the first embodiment of the invention, shown in FIG. 4, the control circuit 24B comprises the first attenuator 27 connected between the positive and common supply lines 16 and 20, respectively, and having an output 28. The second attenuator 29 is connected between the negative and common supply lines 18 and 20, respectively, and has an output 30, as in the embodiment of FIG. 3.

The offset components 31 and 34 have an input 32, 35 connected to the output 13 of the signal generator 12 and outputs 33 and 36 (FIG. 4). The comparators 25 and 26 have an input 37 connected to the output 30 of the second attenuator 29, an input 38 connected to the output 33 of the offset components 31 and 34, an input 40 connected to the output 28 of the first attenuator 27, an input 41 connected to the output 36 of the offset components 31 and 34, and an output 39, 42 as shown in FIG. 4. The comparators 25 and 26 compare the output waveform of the signal generator 12 with the positive and negative offsets and the attenuated positive and negative outputs of the attenuators 27 and 29, respectively, as in the embodiment of FIG. 3.

The outputs 39 and 42 of the comparators 25 and 26 are connected directly to the additional input 10 of the DC to DC converter 4, so that the coupling 43 of FIG. 3 is eliminated in FIG. 4.

In the embodiments of FIGS. 3 and 4, the DC to DC converter 4 is a single DC to DC converter which supplies both the positive and negative outputs simultaneously. This leads to a high voltage across the linear amplifier 14. In the second embodiment of the invention, shown in FIG. 5, this voltage is reduced to half by the utilization of separate DC to DC converters for the positive and negative half cycles. The pair of DC to DC converters reduce the voltage across the transistors of the linear amplifier 14. Each of the DC to DC converters supplies the full power for one half the time.

Thus, as shown in FIG. 5, in the second embodiment of the invention, a positive output DC to DC converter 44 having inputs 45 and 46 connected to the DC source 3, a positive output 47, a common output 48 and an additional input 49. The positive output DC to DC converter 44 may comprise any suitable positive output DC to DC converter known in the art and converts the DC input power to a positive DC supply at its outputs 47 and 48 with voltages greater than the positive peak values of the AC output 11.

A negative output DC to DC converter 50 has inputs 51 and 52 connected to the DC source 3, a negative output 53, a common output 54 and an additional input 55. The negative output DC to DC converter 50 may comprise any suitable negative output DC to DC converter known in the art and converts the DC input power to a negative DC supply at its outputs 53 and 54 with voltages greater than the negative peak values of the AC output 11.

In the embodiment of FIG. 5, the control circuit 24C comprises the first attenuator 27 connected between the positive and common supply lines 16 and 56, respectively, of the positive output DC to DC converter 44 and having an output 28. The second attenuator 29 is connected between the negative and common supply lines 18 and 57, respectively, of the negative output DC to DC converter 50 and has an output 30 (FIG. 5).

The first comparator 25 has an input 37 connected to the output 28 of the first attenuator 27, another input 38 connected to the output 13 of the signal generator 12 and an output 39 connected to the additional input 49 of the positive output DC to DC converter 44, as shown in FIG. 5. The second comparator 26 has an input 40 connected to the output 30 of the second attenuator 29, another input 41 connected to the output 13 of the signal generator 12 and an output 42 connected to the additional input 55 of the negative output DC to DC converter 50, as shown in FIG. 5.

The comparators 44 and 50 compare the output waveform of the signal generator and the attenuated positive and negative outputs of the attenuators 27 and 29, respectively, thereby controlling the positive output and negative output DC to DC converters 44 and 50, respectively, with the appropriate output of said comparators. Each of the positive output and negative output converters 44 and 50, respectively, supplies the full power for one half the time.

Figure 6:
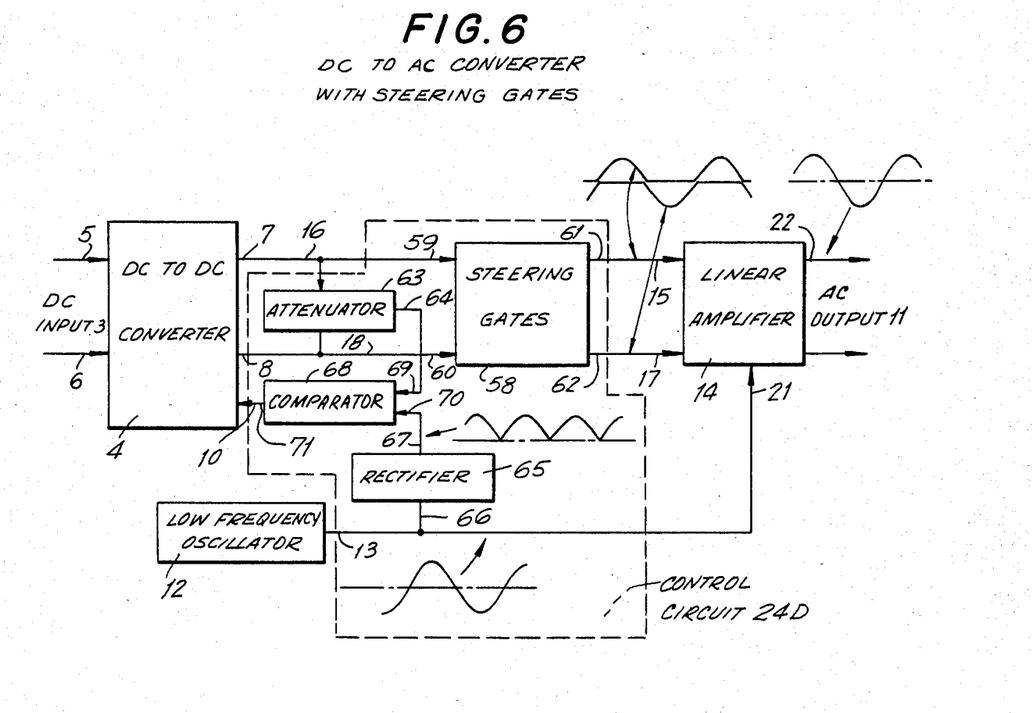
FIG. 6 is a block diagram of a third embodiment of the DC to AC converter of the invention, having steering gates.

The third embodiment of the DC to AC converter of the invention, shown in FIG. 6, utilizes the single DC to DC converter 4 of the embodiments of FIGS. 3 and 4. However, in the third embodiment of the invention, the DC to DC converter 4 is switched alternately positive and negative to achieve the same effect as the second embodiment of FIG. 5. Thus, steering gates are utilized in FIG. 6 to reduce the voltage across the transistors of the linear amplifier 14. The third embodiment of the invention has the disadvantage of transient distortion at output zero crossings.

In the third embodiment of the invention, shown in FIG. 6, the control circuit 24D comprises steering gates 58 of any suitable known type, having an input 59 connected to the positive supply line 16, an input 60 connected to the negative supply line 18, an output 61 connected to the input 15 of the linear amplifier 14 and an output 62 connected to the input 17 of said linear amplifier. The steering gates 58 switch the DC to DC converter alternately positively and negatively.

Figure 9:
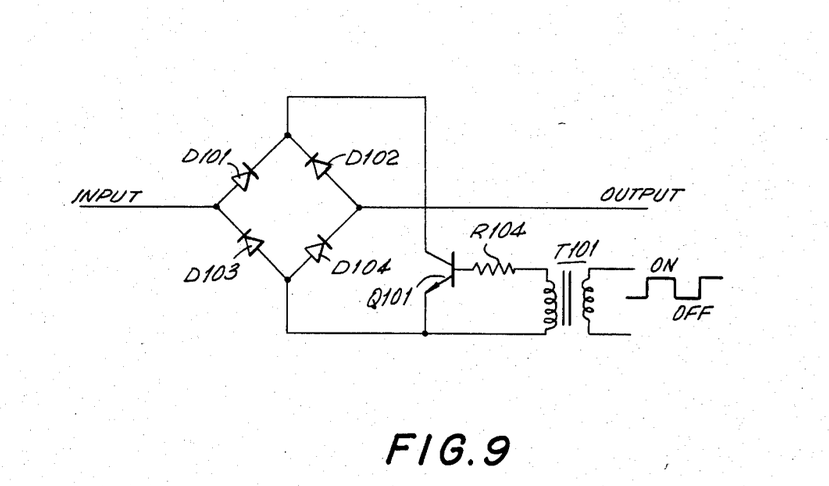
FIG. 9 is a circuit diagram of a steering gate.

The steering gates are electronic switches and can take many forms. A suitable gate is shown in FIG. 9. When the gate is in the 'off' condition, the transistor Q101 base drive is turned negative by applying a suitable voltage to the transformer T101. With this state of affairs there is no current path through the diodes D101 through D104 or Q101, and the switch is open. The switch is closed by applying a positive current into the Q101 base through R104 by putting the right voltage across T101. With Q101 turned on, there is a current path through Q101 and the diodes. For example, when the input is positive, the current flow is through D101, Q101 and D104. When the input is negative, the path is through D103, Q101 and D104.

As shown in FIG. 6, an attenuator 63, which may be identical to the attenuator 27 or 29 hereinbefore described, is connected between the positive and negative supply lines 16 and 18, respectively, between the DC to DC converter 4 and the steering gates 58. The attenuator 63 has an output 64 and provides attenuated positive and negative outputs.

A rectifier 65, of any suitable type known in the art, has an input 66 connected to the output 13 of the signal generator 12 and an output 67 (FIG. 6). The rectifier 65 rectifies the output waveform of the signal generator 12.

A comparator 68, of any suitable known type, has an input 69 connected to the output 64 of the attenuator 63, an input 70 connected to the output 67 of the rectifier 65 and an output 71 connected to the additional input 10 of the DC to DC converter, as shown in FIG. 6.

The AC output need not be sinusoidal but may be any signal with frequency components within the range of the DC to DC converter. DC offsets may be added, or the supply may be operated as a 'fully programmable' bipolar output DC supply.

Figure 7:
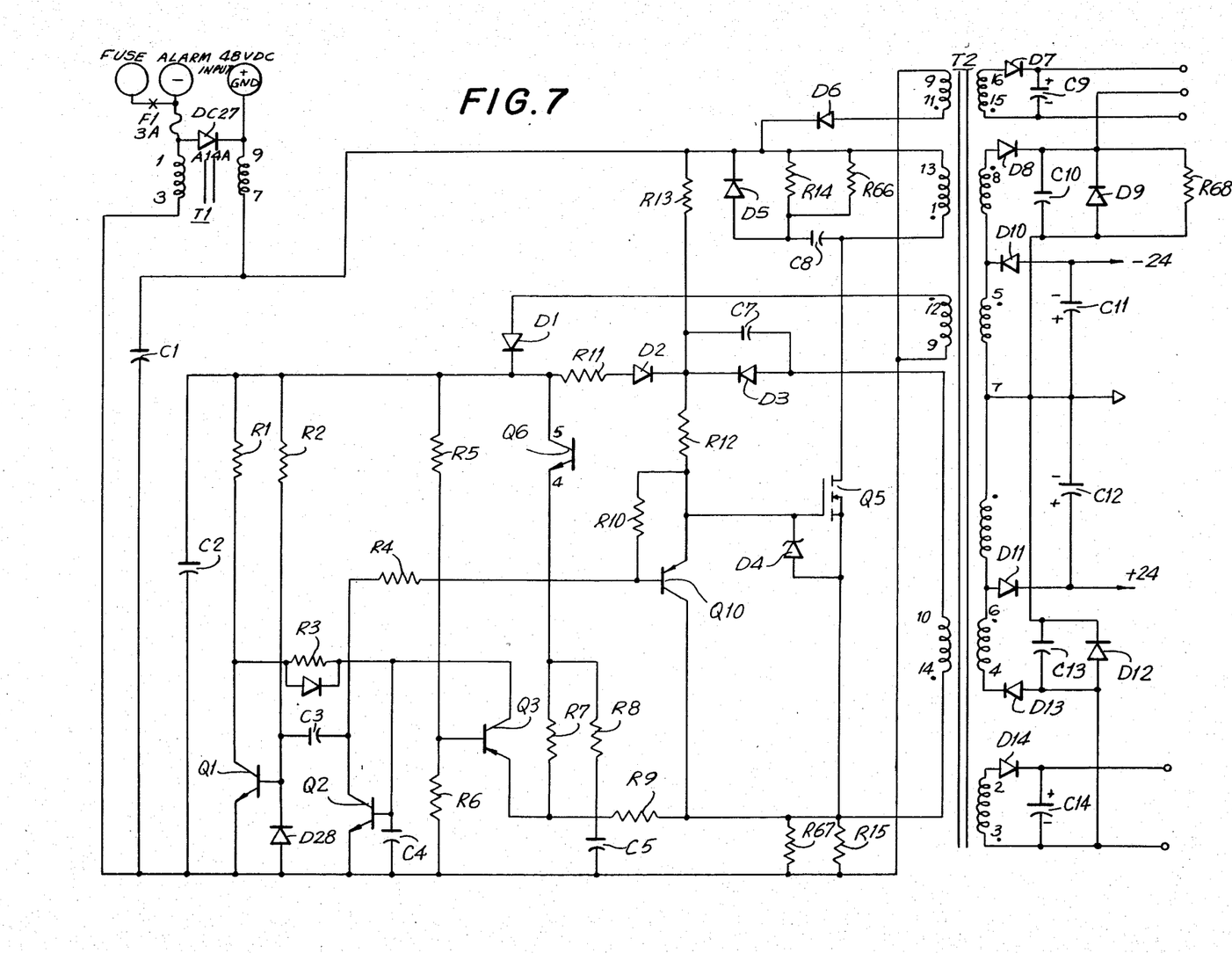
FIG. 7 is a circuit diagram of the first embodiment of the DC to AC converter of the invention.

The DC to AC converter of FIG. 3 is shown in FIG. 7. As shown in FIG. 7, DC to AC converter of FIG. 7 includes transformers T1 and T2, transistors Q1, Q2, Q3, Q4, Q5 and Q6, resistors R1, R2, R3, R4, R5, R6, R7, R8, R9, R10, R11, R12, R13, R14, R15, R66, R67, and R68, capacitors C1, C2, C3, C4, C5, C7, C8, C9, C10, C11, C12, C13 and C14, diodes D1, D2, D3, D5, D6, D7, D8, D9, D10, D11, D12, D13, D14, D27 and D28 and Zener diode D4.

In an operating embodiment of FIG. 7, the transistors Q1 and Q2 were 2N2222 units. The transistors Q3 and Q4 were 2N3906 units. The transistor Q5 was an IRF252 unit.

In the operating embodiment of FIG. 7, the resistors had the following values.

| | |
|---|---|
| R1 = 10 kilohms | R10 = 330 ohms |
| R2 = 47 kilohms | R11 = 2.2 kilohms |
| R3 = 10 kilohms | R12 = 220 ohms |
| R4 = 47 kilohms | R13 = 22 kilohms |
| R5 = 820 ohms | R14 = 220 ohms at 2 watts |
| R6 = 270 ohms | R15 = .22 ohm at 2 watts |
| R7 = 470 ohms | R66 = 220 ohms at 2 watts |
| R8 = 1.5 kilohms | R67 = .22 ohm at 2 watts |
| R9 = 470 ohms | R68 = 82 kilohms at 1 watt |

In the operating embodiment of FIG. 7, the capacitors had the following values.
C1 = 100 farads at 60 volts
C2 = 470 farads at 35 volts
C3 = 100 picofarads at 1000 volts
C4 = 0.0047 microfarad at 1000 volts
C5 = 1 microfarad at 35 volts
C7 = 0.022 microfarad at 50 volts
C8 = 0.01 microfarad at 500 volts
C9 = 100 microfarads at 25 volts
C10 = 1.5 microfarad at 400 volts
C11 = 470 farads at 35 volts
C12 = 470 farads at 35 volts
C13 = 1.5 microfarads at 400 volts
C14 = 100 microfarads at 25 volts In the operating embodiment of FIG. 7, the diodes D1, D3, D6, D7, D10, D11, D13 and D14 were BYV26D units, the diode D2 was an IN4148 unit, the diode D5 was a BYV26C unit, the diode D8 was a BYV26 unit, the diodes D9 and D12 were IN4005 units, the diode D27 was an A14A unit and the diode D28 was an IN4148 unit. The Zener diode D4 was an IN5349 unit.

While the invention has been described by means of specific examples and in specific embodiments, we do not wish to be limited thereto, for obvious modifications will occur to those skilled in the art without departing from the spirit and scope of the invention.

We claim:

1. In a DC to AC converter for converting power from a DC source to an AC amplifier having an output voltage and having DC to DC converter means having inputs connected to said DC source, said DC to DC converter having a plurality of output DC terminals for positive, negative and common, respectively, and having an additional input for converting DC input power to positive and negative DC voltage at said output DC terminals with voltages greater than the peak values of the AC output voltage, a low frequency signal generator having an output for generating an output waveform at its output, said AC amplifier being a linear amplifier having positive, negative and common inputs connected to the corresponding output DC terminals of said DC to DC converter means via positive, negative and common supply lines, respectively, an additional input connected to the output of said signal generator and an output whereby the AC output voltage varies with the output waveform of said signal generator, said AC output voltage being provided at the output of said amplifier and a common point in the common supply line,     control means connected to the output DC terminals of said DC to DC converter means and between the output of said signal generator and the additional input of said DC to DC converter means for controlling the output voltage of said DC to DC converter means to provide a voltage which is less than the maximum voltage available from said DC to DC converter, but greater than the instantaneous voltage required at the output of said AC amplifier linear amplifier, thereby assuring high overall efficiency and a high quality output waveform.

2. A DC to AC converter as claimed in claim 1, wherein said signal generator comprises a low frequency oscillator.

3. A DC to AC converter as claimed in claim 1, wherein said signal generator comprises a waveform generator.

4. A DC to AC converter as claimed in claim 1, wherein said control means includes means for controlling the positive and negative supply voltages to follow the AC output voltage as closely as possible at all times whereby said supply voltages resemble the outputs of a full wave rectifier.

5. A DC to AC converter as claimed in claim 1, wherein said amplifier draws current from one of the positive and negative DC supplies and whichever supply is not loaded has a higher amplitude, and said control means includes means for responding only to the loaded DC to DC converter means output which for positive instantaneous output voltages is the positive output and the positive supply is controlled, and for negative instantaneous output voltages is the negative output and the negative supply is controlled.

6. A DC to AC converter as claimed in claim 5, wherein said means for responding of said control means comprises a pair of comparators for positive and negative half cycles.

7. A DC to AC converter as claimed in claim 5, wherein said control means comprises a first attenuator connected between said positive and common supply lines and having an output, a second attenuator connected between said negative and common supply lines and having an output, said attenuators providing attenuated positive and negative outputs, positive offset means having an input connected to the output of said signal generator and an output, negative offset means having an input connected to the output of said signal generator and an output, said positive and negative offset means adding offsets for the positive and negative half cycles, respectively, to the output waveform of said signal generator to establish the difference voltage between the input and output of said linear amplifier, a first comparator having an input connected to the output of said second attenuator, an input connected to the output of said positive offset means and an output, a second comparator having an input connected to the output of said first attenuator, an input connected to the output of said negative offset means and an output, said comparators comparing the output waveform of said signal generator with said offsets and the attenuated positive and negative outputs of said attenuators, and coupling means coupling the outputs of said comparators to the additional input of said DC to DC converter means thereby controlling said DC to DC converter means with the appropriate output of said comparators.

8. A DC to AC converter as claimed in claim 5, wherein said control means comprises a first attenuator connected between said positive and common supply lines and having an output, a second attenuator connected between said negative and common supply lines and having an output, said attenuators providing attenuated positive and negative outputs, offset means having an input connected to the output of said signal generator and outputs for adding offsets for the positive and negative half cycles, respectively, to the output waveform of said signal generator to establish the difference voltage between the input and output of said linear amplifier, and comparator means having an input connected to the output of said first attenuator, an input connected to an output of said offset means, an input connected to the output of said second attenuator, an input connected to another output of said offset means and an output connected to the additional input of said DC to DC converter means.

9. A DC to AC converter as claimed in claim 5, wherein said DC to DC converter means comprises a single DC to DC converter.

10. A DC to AC converter as claimed in claim 5, wherein said DC to DC converter means comprises a positive output DC to DC converter having inputs connected to said DC source, positive and common outputs and an additional input for converting DC input power to a positive DC supply at its outputs with voltages greater than the positive peak values of the AC output and a negative output DC to DC converter having inputs connected to said DC source, negative and common outputs and an additional input for converting DC input power to a negative DC supply at its outputs with voltages greater than the negative peak values of the AC output.

11. A DC to AC converter as claimed in claim 5, wherein said control means comprises steering gate means having an input connected to said positive supply line, an input connected to said negative supply line, an output connected to an input of said linear amplifier and an output connected to another input of said linear amplifier, said steering gate means switching said DC to DC converter means alternately positively and negatively, an attenuator connected between said positive and negative supply lines between said DC to DC converter means and said steering gate means and having an output, said attenuator providing attenuated positive and negative outputs, rectifier means having an input connected to the output of said signal generator and an output for rectifying the output waveform of said signal generator, and comparator means having an input connected to the output of said attenuator, an input connected to the output of said rectifier means and an output connected to the additional input of said DC to DC converter means.

12. A DC to AC converter as claimed in claim 7, wherein said coupling means includes frequency compensating means and controls the amplitude of the output of said comparators.

13. A DC to AC converter as claimed in claim 7, wherein said coupling means includes decision network means and phase compensating means for advancing the phase of said output waveform to obtain an increased voltage differential across said linear amplifier at the leading edge of said output waveform.

14. A DC to AC converter as claimed in claim 10, wherein said control means comprises a first attenuator connected between said positive and common supply lines of said positive output converter and having an output, a second attenuator connected between said negative and common supply lines of said negative output converter and having an output, said attenuators providing attenuated positive and negative outputs, a first comparator having an input connected to the output of said first attenuator, another input connected to the output of said signal generator and an output connected to the additional input of said positive output converter, and a second comparator having an input connected to the output of said second attenuator, another input connected to the output of said signal generator and an output connected to the additional input of said negative output converter, said comparators comparing the output waveform of said signal generator and the attenuated positive and negative outputs of said attenuators thereby controlling said positive output and negative output converters with the appropriate output of said comparators, each of said positive output and negative output converters supplying the full power for one half the time.

* * * * *